T. LYNCH.
HOG EATING POULTRY PROTECTOR OR HOG MUZZLE.
APPLICATION FILED APR. 30, 1920.

1,398,031.

Patented Nov. 22, 1921.

INVENTOR:
THOMAS LYNCH
By Earl M. Sinclair
Atty.

UNITED STATES PATENT OFFICE.

THOMAS LYNCH, OF JEFFERSON, IOWA.

HOG-EATING POULTRY-PROTECTOR OR HOG-MUZZLE.

1,398,031.   Specification of Letters Patent.   Patented Nov. 22, 1921.

Application filed April 30, 1920. Serial No. 377,835.

*To all whom it may concern:*

Be it known that I, THOMAS LYNCH, a citizen of the United States of America, and resident of Jefferson, Greene county, Iowa, have invented a new and useful Hog-Eating Poultry-Protector or Hog-Muzzle, of which the following is a specification.

The object of this invention is to provide improved means adapted to be attached to the nose of swine to prevent the swine from catching poultry or the like.

My invention consists in the construction, arrangement and combination of elements hereinafter set forth, pointed out in my claims and illustrated by the accompanying drawing, in which—

Figure 1 is a perspective illustrating the preferred form of my invention in position for practical use. Fig. 2 is a side elevation of the device detached.

In the construction of the device as shown a piece of wire is bent and shaped so as to form a cross member 10 at its central portion, and loops or eyes 11, 12 which are slightly spaced apart, the opposite end portions of the wire being extended downwardly from the loops 11, 12 and across the cross member 10 to provide arms 13, 14. The arms 13, 14 are relatively long and preferably diverge toward their free ends. The arms 13, 14 also are bent forwardly between their ends, at the points 15, 16 to form obtuse angles.

In practical use the device so formed is adapted to be attached permanently to the nose such as 17 of a swine by means of rings 18, 19, which rings may be of the ordinary type employed in the noses of swine to prevent rooting and the like. The rings 18, 19 are first caused to engage the loops or eyes 11, 12 of the device and then are placed in position through the upper portion of the nose 17 by the ordinary means such as a hand tool not shown. When so mounted the cross member 10 of the device extends transversely across the central portion of the nose 17 and said cross member, together with the eyes 11, 12 and upper portions of the arms 13, 14, may lie in contact with the flat end portion of the animal's nose. The lower portions of the arms 13, 14, particularly below the angles 15, 16 thereof, project below the animal's nose and forwardly therefrom on an inclined plane, thus forming a shield across the front of the animal's mouth. A swine to which my device has been attached may feed from the ground or from a trough but is prevented, by means of the arms 13, 14 from seizing in its mouth objects elevated from the ground, such as chickens or other small animals. In the event the swine attempts to catch in his mouth a chicken or the like the ends of the forwardly and downwardly extending arms 13, 14 engage the ground or other surface, the upper portion of the device is pressed against the end of his nose, and a pull is exerted on the rings 18, 19 passing through his nose. Thus the device serves not only as a shield hanging in front of the mouth of the animal to prevent his seizing objects in his mouth, but also acts as a warning and deterrent agency by the painful effect on his nose. It will be noted that the device is suspended at two points spaced apart transversely and is free to swing upwardly to a certain extent on a transverse horizontal axis so that it will not interfere with the proper feeding activities of the animal; but that it cannot swing to one side or be turned upwardly over the animal's snout.

I do not desire to be understood as limiting myself as to the precise shape and arrangement herein shown and described as the same may be modified within the scope of the appended claims without departing from the spirit of my invention.

I claim as my invention—

1. A device of the class described comprising a single piece of wire bent to form laterally spaced loops and also spaced arms extending downwardly from said loops, together with rings by means of which said loops may be pivotally attached to the nose of an animal, said arms being of sufficient length to project below the level of the animal's mouth when so attached, said arms being bent forwardly at obtuse angles between their ends at points substantially on the level of the lower edge of the animal's snout.

2. A device of the class described, comprising a single piece of wire having a straight horizontal central portion, said wire being bent upwardly, inwardly and then downwardly at each end of the said straight portion to form spaced loops, said wire being then extended straight downwardly in front of said horizontal portion to form arms diverging slightly and being bent forwardly intermediate of their ends on obtuse angles.

Signed at Jefferson, in the county of Greene and State of Iowa, this 23d day of April, 1920.

THOMAS LYNCH.